United States Patent
Dong et al.

(10) Patent No.: US 10,193,755 B2
(45) Date of Patent: Jan. 29, 2019

(54) POLICY CONFLICT RESOLUTION METHOD AND APPARATUS

(71) Applicant: Huawei Technologies Co., Ltd., Shenzhen (CN)

(72) Inventors: Wenxia Dong, Beijing (CN); Chengyong Lin, Beijing (CN); Wanfu Ding, Shenzhen (CN); Fengkai Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 15/410,092

(22) Filed: Jan. 19, 2017

(65) Prior Publication Data
US 2017/0134233 A1 May 11, 2017

Related U.S. Application Data

(63) Continuation of application No. PCT/CN2015/083379, filed on Jul. 6, 2015.

(30) Foreign Application Priority Data

Jul. 21, 2014 (CN) .......................... 2014 1 0348832

(51) Int. Cl.
*H04L 12/28* (2006.01)
*H04L 12/24* (2006.01)
(Continued)

(52) U.S. Cl.
CPC .......... *H04L 41/0893* (2013.01); *H04L 45/56* (2013.01); *H04L 47/19* (2013.01);
(Continued)

(58) Field of Classification Search
CPC ..... H04L 41/0893; H04L 45/56; H04L 47/19; H04L 41/5048; H04L 41/0886; H04L 41/142
See application file for complete search history.

(56) References Cited

U.S. PATENT DOCUMENTS 6,393,473 B1 * 5/2002 Chu .................... H04L 41/0213
709/223
2005/0276262 A1 12/2005 Schuba et al.
(Continued)

FOREIGN PATENT DOCUMENTS

CN 101339591 A 1/2009
CN 102215212 A 10/2011
(Continued)

OTHER PUBLICATIONS

Feng Wang, "Network Element Based Method for Policy Conflict Resolution", Computer Engineering and Applications, 43(1), 2007, 6 pages.
(Continued)

*Primary Examiner* — Phuc H Tran
(74) *Attorney, Agent, or Firm* — Slater Matsil, LLP

(57) ABSTRACT

This application discloses a policy conflict resolution method which includes receiving a first control policy and decomposing the first control policy into m first rules, and receiving a second control policy and decomposing the second control policy into n second rules. The method also includes performing negation on each first rule to obtain a first negation rule, performing negation on each second rule to obtain a second negation rule, and generating a corresponding first execution rule by using each first negation rule and each second negation rule according to a rule synthesis principle. Additionally, the method includes deleting an invalid rule, using a remaining one of the first execution rules as a valid first execution rule, performing
(Continued)

negation on each valid first execution rule, and converting, according to a protocol supported by a first forwarding device, each valid first execution rule on which negation has been performed into a corresponding forwarding entry of the first forwarding device.

17 Claims, 4 Drawing Sheets

(51) Int. Cl.
  *H04L 12/771* (2013.01)
  *H04L 12/801* (2013.01)
(52) U.S. Cl.
  CPC ........ *H04L 41/0886* (2013.01); *H04L 41/142* (2013.01); *H04L 41/5048* (2013.01)

(56) References Cited

U.S. PATENT DOCUMENTS

| | | |
|---|---|---|
| 2007/0245018 A1 | 10/2007 | Bhola et al. |
| 2011/0205931 A1 | 8/2011 | Zhou et al. |
| 2013/0212641 A1* | 8/2013 | Stiekes ............... H04L 63/0227 726/1 |
| 2014/0143199 A1 | 5/2014 | Allen et al. |
| 2014/0156823 A1* | 6/2014 | Liu ..................... H04L 41/0893 709/223 |
| 2014/0334295 A1* | 11/2014 | Guichard ............ H04L 47/2475 370/230 |

FOREIGN PATENT DOCUMENTS

| | | |
|---|---|---|
| CN | 102760076 A | 10/2012 |
| CN | 102957697 A | 3/2013 |
| CN | 103516550 A | 1/2014 |
| CN | 104104615 A | 10/2014 |
| CN | 104104615 B | 7/2017 |

OTHER PUBLICATIONS

Open Networking Foundation, "OpenFlow Switch Specification", Version 1.3.4 (Protocol version 0x04), Mar. 27, 2014, 171 pages.

* cited by examiner

POLICY CONFLICT RESOLUTION METHOD AND APPARATUS

CROSS-REFERENCE TO RELATED APPLICATIONS

This application is a continuation of International Application No. PCT/CN2015/083379, filed on Jul. 6, 2015, which claims priority to Chinese Patent Application No. 201410348832.2, filed on Jul. 21, 2014. The disclosures of the aforementioned applications are hereby incorporated by reference in their entireties.

TECHNICAL FIELD

This application relates to the communications field, and in particular, to a policy conflict resolution method and apparatus.

BACKGROUND

Software defined networking (SDN) is a new network architecture. Compared with internet protocol (IP) route searching used in a conventional network, SDN/OpenFlow can implement flexible control of network traffic, so as to provide a desirable platform for innovation of core networks and applications, and is a direction of development of network architectures in the future.

As shown in FIG. 1, the SDN generally includes two parts: a controller 110 and forwarding devices 120. The controller 110 is connected to each forwarding device 120 in the network, and the forwarding devices 120 in the network are topologically connected. The controller 110 is responsible for centralized control of the network, that is, after receiving a control policy, the controller 110 generates a forwarding path according to the control policy, and generates a forwarding entry for each forwarding device 120. After receiving the forwarding entry, the forwarding device 120 performs, according to the received forwarding entry, matching and forwarding on a packet sent by a user terminal.

However, in some cases, some policies received by the controller 110 may be in conflict with each other.

For example, daily work of a research and development department involves secrets of a company, and the research and development department is strictly prohibited from accessing an external network, and can access only an internal network of the company. Therefore, an administrator may deliver a policy 1 to a controller according to the feature of the research and development department, where the policy 1 acts on a forwarding device S0. The forwarding device S0 forwards a packet, which satisfies the policy 1, of a user terminal to another forwarding device in the SDN, and then the another forwarding device forwards the packet to a corresponding network, for example, an external network or an internal network.

Policy 1: A server of the research and development department cannot access the external network, and all employees of the research and development department can access the internal network of the company by using a forwarding device S1.

Moreover, a pre-research group in the research and development department needs to access the external network to collect data. Therefore, the administrator may deliver a policy 2 to the controller according to the feature of the pre-research group, where the policy 2 also acts on the forwarding device S0. The forwarding device S0 forwards a packet, which satisfies the policy 2, of a user terminal to another forwarding device in the SDN, and then the another forwarding device forwards the packet to a corresponding network, for example, an external network or an internal network.

Policy 2: A server of the pre-research group cannot access a secure shell (Secure Shell, SSH) service, and employees of the pre-research group can access the external network by using a forwarding device S2.

As can be analyzed from the foregoing two policies, it is intended that employees of the pre-research group should be able to access the external network. However, actually, because the pre-research group is a part of the research and development department, and in the policy 1, all the employees of the research and development department are prohibited from accessing the external network, the controller 110 cannot perform processing after receiving the two conflicting control policies. Therefore, the controller 110 can convert only a policy with a highest priority into a forwarding entry, and sends the forwarding entry to the forwarding device S0, so that the forwarding device S0 can only forward a packet according to the policy with the highest priority. A priority of the policy 1 delivered for the research and development department is higher than a priority of the policy 2 delivered for the pre-research group; therefore, the forwarding device S0 forwards a packet only according to the policy 1, and does not forward a packet according to the policy 2, which results in that the pre-research group stays unable to access the external network.

SUMMARY

This application provides a policy conflict resolution method and apparatus, which can resolve a policy conflict.

A first aspect of this application provides a policy conflict resolution method, where the method includes receiving a first control policy and decomposing the first control policy into m first rules, and receiving a second control policy and decomposing the second control policy into n second rules, where m and n are natural numbers, both the first control policy and the second control policy act on a first forwarding device, and the first rules and the second rules each include a matching field and an action. The method also includes performing negation on each first rule to obtain a first negation rule, performing negation on each second rule to obtain a second negation rule, and generating a corresponding first execution rule by using each first negation rule and each second negation rule according to a rule synthesis principle. The rule synthesis principle includes forming the first execution rule by using the following: an intersection between a matching field of a first negation rule and a matching field of a second negation rule that are of a same matching field type or a union between a matching field of a first negation rule and a matching field of a second negation rule that are of different matching field types, and an intersection between an action of the first negation rule and an action of the second negation rule. The method also includes using a first execution rule, in which there is no intersection between the matching field of the first negation rule and the matching field of the second negation rule that are of the same matching field type, as an invalid rule. Also, the method includes deleting the invalid rule, using a remaining one of the first execution rules as a valid first execution rule, performing negation on each valid first execution rule, and converting, according to a protocol supported by the first forwarding device, each valid first execution rule on which negation has been performed into a corresponding forwarding entry of the first forwarding device.

With reference to the first aspect, in a first possible implementation manner of the first aspect of this application, the performing negation on each first rule is keeping the matching field of the first rule unchanged and performing negation on the action of the first rule, and the performing negation on each second rule is keeping the matching field of the first rule unchanged and performing negation on the action of the first rule.

With reference to the first possible implementation manner of the first aspect, in a second possible implementation manner of the first aspect of this application, the generating a corresponding first execution rule by using each first negation rule and each second negation rule according to a rule synthesis principle includes: using each first negation rule as an element and performing arrangement according to a priority sequence of the first rules to constitute a first matrix, where the first matrix is a column matrix; using each second negation rule as an element and performing arrangement according to a priority sequence of the second rules to constitute a second matrix, where the second matrix is a row matrix; multiplying the first matrix by the second matrix to obtain a first execution rule matrix; and generating, according to the rule synthesis principle, the corresponding first execution rule by using each pair of the first negation rule and the second negation rule that are multiplied and that are in the first execution rule matrix, where priorities of the first execution rules of the first execution rule matrix are first sorted according to a column sequence of the matrix, and priorities of first execution rules in a same column are sorted according to a row sequence of the matrix.

With reference to the second possible implementation manner of the first aspect, in a third possible implementation manner of the first aspect of this application, after the decomposing the first control policy into m first rules, the method further includes: adding a first matching rule as a first rule whose priority is the lowest; and after the decomposing the second control policy into n second rules, the method further includes: adding a second matching rule as a second rule whose priority is the lowest, where matching fields of the first matching rule and the second matching rule are both wildcard characters, and actions of the first matching rule and the second matching rule are both discarding.

With reference to the second possible implementation manner of the first aspect, in a fourth possible implementation manner of the first aspect of this application, the using a remaining one of the first execution rules as a valid first execution rule includes: comparing matching fields of every two remaining first execution rules; if a matching field of one first execution rule covers a matching field of the other first execution rule, deleting the first execution rule whose matching field is relatively small, or if the matching fields of the two first execution rules are the same, deleting a first execution rule whose priority is relatively low; and using a remaining first execution rule as the valid first execution rule after the first execution rule whose matching field is relatively small and the first execution rule whose priority is relatively low are deleted.

With reference to the second or fourth possible implementation manner of the first aspect, in a fifth possible implementation manner of the first aspect of this application, the method further includes: receiving a third control policy and decomposing the third control policy into k third rules, where k is a natural number, and the third control policy and the first and second control policies all act on the first forwarding device; performing negation on each valid first execution rule to obtain each first negation execution rule, and performing negation on each third rule to obtain each third negation rule; using each first negation execution rule as an element and performing arrangement according to a priority sequence of the first execution rules to constitute a third matrix, where the third matrix is a column matrix; using each third negation rule as an element and performing arrangement according to a priority sequence of the third rules to constitute a fourth matrix, where the fourth matrix is a row matrix; multiplying the third matrix by the fourth matrix to obtain a second execution rule matrix; generating, according to the rule synthesis principle, a corresponding second execution rule by using each pair of the first negation execution rule and the third negation rule that are multiplied and that are in the second execution rule matrix, where the rule synthesis principle further includes: forming the second execution rule by using the following: an intersection between a matching field of a first negation execution rule and a matching field of a third negation rule that are of a same matching field type or a union between a matching field of a first negation execution rule and a matching field of a third negation rule that are of different matching field types, and an intersection between an action of the first negation execution rule and an action of the third negation rule; and using a second execution rule, in which there is no intersection between the matching field of the first negation execution rule and the matching field of the third negation rule that are of the same matching field type, as an invalid rule; and deleting the invalid rule, performing negation on each remaining second execution rule, and converting, according to the protocol supported by the first forwarding device, each remaining second execution rule on which negation has been performed into a corresponding forwarding entry of the first forwarding device.

A second aspect of this application provides a policy conflict resolution apparatus, including a receiving module, a synthesis module, and a deletion module. The receiving module is configured to receive a first control policy and decompose the first control policy into m first rules, and receive a second control policy and decompose the second control policy into n second rules, where m and n are natural numbers, both the first control policy and the second control policy act on a first forwarding device, and the first rules and the second rules each include a matching field and an action. Additionally, the receiving module sends the m first rules and the n second rules to the synthesis module. The synthesis module is configured to receive the m first rules and the n second rules, perform negation on each first rule to obtain a first negation rule, perform negation on each second rule to obtain a second negation rule, and generate a corresponding first execution rule by using each first negation rule and each second negation rule according to a rule synthesis principle. The rule synthesis principle includes forming the first execution rule by using the following: an intersection between a matching field of a first negation rule and a matching field of a second negation rule that are of a same matching field type or a union between a matching field of a first negation rule and a matching field of a second negation rule that are of different matching field types, and an intersection between an action of the first negation rule and an action of the second negation rule, and using a first execution rule, in which there is no intersection between the matching field of the first negation rule and the matching field of the second negation rule that are of the same matching field type, as an invalid rule; and the synthesis module sends the synthesized first execution rule to the deletion module. The deletion module is configured to receive the synthesized first execution rule, delete the invalid rule, use a remaining one of the first execution rules as a valid first execution rule, perform negation on each valid first execution rule, and convert, according to a protocol supported by the first forwarding device, each valid first execution rule on which negation has been performed into a corresponding forwarding entry of the first forwarding device.

With reference to the second aspect, in a first possible implementation manner of the second aspect of this application, performing negation on the first rule is keeping the matching field of the first rule unchanged and performing negation on the action of the first rule, and performing negation on the second rule is keeping the matching field of the second rule unchanged and performing negation on the action of the second rule.

With reference to the first possible implementation manner of the second aspect, in a second possible implementation manner of the second aspect of this application, the synthesis module is further configured to: use each first negation rule as an element and perform arrangement according to a priority sequence of the first rules to constitute a first matrix, where the first matrix is a column matrix; use each second negation rule as an element and perform arrangement according to a priority sequence of the second rules to constitute a second matrix, where the second matrix is a row matrix; multiply the first matrix by the second matrix to obtain a first execution rule matrix; and generate, according to the rule synthesis principle, the corresponding first execution rule by using each pair of the first negation rule and the second negation rule that are multiplied and that are in the first execution rule matrix, where priorities of the first execution rules of the first execution rule matrix are first sorted according to a column sequence of the matrix, and priorities of first execution rules in a same column are sorted according to a row sequence of the matrix.

With reference to the second possible implementation manner of the second aspect, in a third possible implementation manner of the second aspect of this application, the synthesis module is further configured to: after the first control policy is decomposed into the m first rules, add a first matching rule as a first rule whose priority is the lowest; and after the second control policy is decomposed into the n second rules, add a second matching rule as a second rule whose priority is the lowest, where matching fields of the first matching rule and the second matching rule are both wildcard characters, and actions of the first matching rule and the second matching rule are both discarding.

With reference to the second possible implementation manner of the second aspect, in a fourth possible implementation manner of the second aspect of this application, the synthesis module is further configured to: after the invalid rule is deleted, compare matching fields of every two remaining first execution rules; if a matching field of one first execution rule covers a matching field of the other first execution rule, delete the first execution rule whose matching field is relatively small, or if the matching fields of the two first execution rules are the same, delete a first execution rule whose priority is relatively low; and use a remaining first execution rule as the valid first execution rule after the first execution rule whose matching field is relatively small and the first execution rule whose priority is relatively low are deleted.

With reference to the second or fourth possible implementation manner of the second aspect, in a fifth possible implementation manner of the second aspect of this application, the receiving module is further configured to: receive a third control policy and decompose the third control policy into k third rules, where k is a natural number, and the third control policy and the first and second control policies all act on the first forwarding device; and the receiving module sends the k third rules to the synthesis module;

the synthesis module is further configured to: receive the k third rules; perform negation on each valid first execution rule to obtain each first negation execution rule, and perform negation on each third rule to obtain each third negation rule; use each first negation execution rule as an element and perform arrangement according to a priority sequence of the first execution rules to constitute a third matrix, where the third matrix is a column matrix; use each third negation rule as an element and perform arrangement according to a priority sequence of the third rules to constitute a fourth matrix, where the fourth matrix is a row matrix; multiply the third matrix by the fourth matrix to obtain a second execution rule matrix; generate, according to the rule synthesis principle, a corresponding second execution rule by using each pair of the first negation execution rule and the third negation rule that are multiplied and that are in the second execution rule matrix, where the rule synthesis principle further includes: forming the second execution rule by using the following: an intersection between a matching field of a first negation execution rule and a matching field of a third negation rule that are of a same matching field type or a union between a matching field of a first negation execution rule and a matching field of a third negation rule that are of different matching field types, and an intersection between an action of the first negation execution rule and an action of the third negation rule; and using a second execution rule, in which there is no intersection between the matching field of the first negation execution rule and the matching field of the third negation rule that are of the same matching field type, as an invalid rule; and the synthesis module sends the synthesized second execution rule to the deletion module; and the deletion module is further configured to: receive the synthesized second execution rule, delete the invalid rule, perform negation on each remaining second execution rule, and convert, according to the protocol supported by the first forwarding device, each remaining second execution rule on which negation has been performed into a corresponding forwarding entry of the first forwarding device.

In the foregoing solutions, a first control policy is decomposed into m first rules, a second control policy is decomposed into n second rules, and each first rule and each second rule are synthesized according to a rule synthesis principle. Because in the rule synthesis principle, a first execution rule in which there is no intersection between a matching field of a first negation rule and a matching field of a second negation rule that are of a same matching field type is used as an invalid rule, and the invalid rule defined above is a rule part that causes a conflict between the first and second control policies, a case in which a conflicting rule exists between the first control policy and the second control policy is avoided by deleting an invalid rule in which a conflict exists, that is, a policy conflict problem is resolved, so that in first forwarding device, both the first control policy and the second control policy can be executed.

DETAILED DESCRIPTION OF ILLUSTRATIVE EMBODIMENTS

In the following description, to illustrate rather than limit, specific details such as a particular system structure, an interface, and a technology are provided for a thorough understanding of this application. However, a person skilled in the art should know that this application may be practiced in other implementation manners without these specific details. In other cases, detailed descriptions of well-known apparatuses, circuits, and methods are omitted, so that this application is described without being obscured by unnecessary details.

Figure 1:
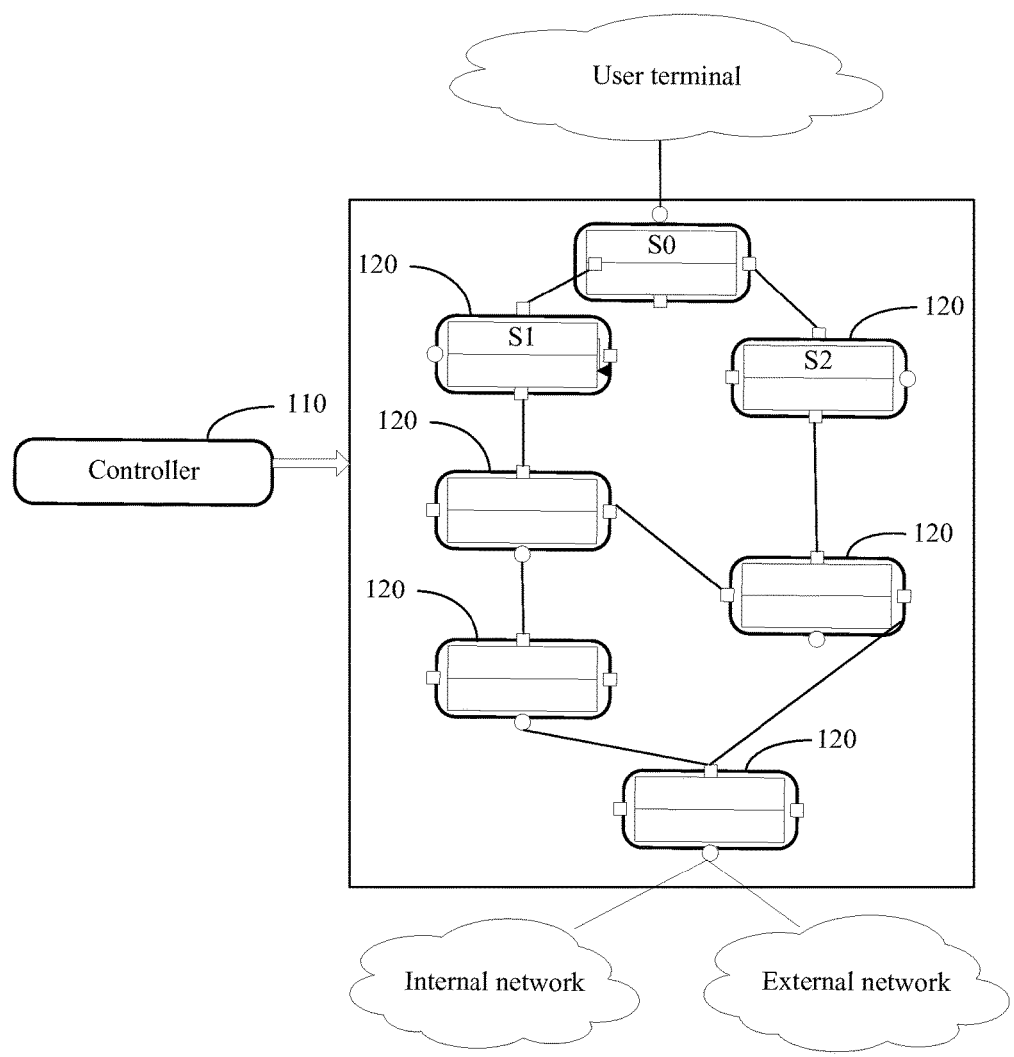
FIG. 1 is a schematic structural diagram of an implementation manner of software defined networking in the prior art.
Figure 2:
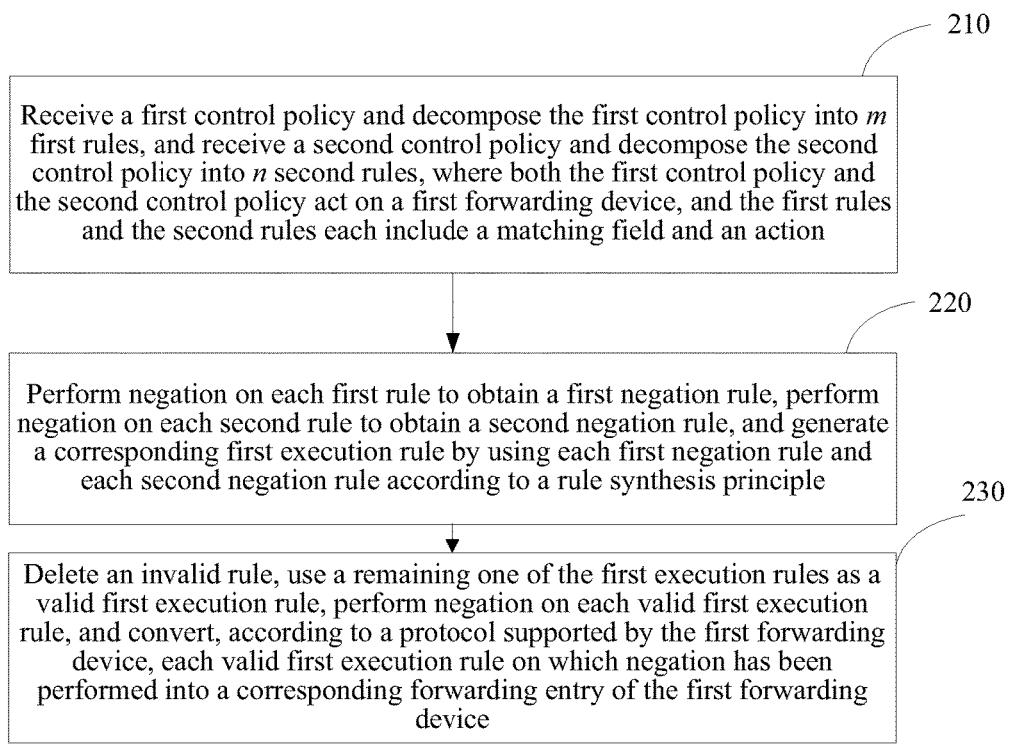
FIG. 2 is a flowchart of an implementation manner of a policy conflict resolution method according to this application.

Referring to FIG. 2, FIG. 2 is a flowchart of an implementation manner of a policy conflict resolution method according to this application. An execution body of steps shown in FIG. 2 may be a controller in software defined networking (SDN), or may be a server in an orchestration layer in an SDN. That the controller is the execution body is used as an example in the following, and the method includes.

210: The controller receives a first control policy and decomposes the first control policy into m first rules, and receives a second control policy and decomposes the second control policy into n second rules, where m and n are natural numbers, both the first control policy and the second control policy act on a first forwarding device, that is, the first forwarding device not only needs to forward a corresponding packet according to the first control policy but also needs to forward a corresponding packet according to the second control policy, and the first rules and the second rules each include a matching field and an action.

The following descriptions are made by using an example in which the two policies mentioned in the background are used as the first control policy and the second control policy. A decomposition principle is performing decomposition to obtain a policy atom that is functionally the smallest, that is, performing decomposition until a rule that is obtained by means of decomposition cannot be decomposed any more.

The controller receives a first control policy acting on a first forwarding device S0: "a server of a research and development department cannot access an external network, and all employees of the research and development department can access an internal network of a company by using a forwarding device S1," where an internet protocol (IP) address of an employee of the research and development department is located in a network segment 10.0.0.0/8 (that is, a network segment from 10.0.0.1 to 10.255.255.255), "\" represents "except," an IP address of the server of the research and development department is 10.0.0.1, ∪ represents "or," a port 80 is used for access to the external network, and →{ S1}represents "by using the forwarding device S1." In this way, the first control policy may be described as: SrcAddr:10.0.0.0/8:\(SrcAddr:10.0.0.1∪ Dst-Port:80→{S1}. The controller decomposes the first control policy, and can obtain three first rules:

(1) The server 10.0.0.1 of the research and development department cannot access the external network by using the forwarding device S1.

First rule A1: SrcAddr:10.0.0.1:{ }, where content in { } is empty, which means "discarding". The "discarding" in this application means executing none of actions in the control policy. For example, an action of the first control policy is going to S1, and a discarding action in the first rule obtained by decomposing the first control policy is not going to S1.

(2) An employee of the research and development department cannot access the external network by using the forwarding device S1.

First rule A2: DstPort:80:{ }.

(3) An employee of the research and development department accesses the internal network by using the forwarding device S1.

First rule A3: SrcAddr:10.0.0.0/8:{S1}, where {S1} means going to S1.

The controller receives a second control policy acting on the first forwarding device S0: "a server of a pre-research group cannot access an SSH service, and an employee of the pre-research group can access the external network by using a forwarding device S2", where an IP address of an employee of the pre-research group is located in a network segment 10.2.0.0/16 (that is, a network segment from 10.2.0.1 to 10.2.255.255), "\" represents "except", an IP address of the pre-research server is 10.2.0.1, ∪ represents "or", and a port 22 is used for access to the SSH service. In this way, the second control policy may be described as: SrcAddr:10.2.0.0/16\(SrcAddr:10.2.0.1∪ DstPort:22)→{S2}. The controller decomposes the second control policy, and can obtain three second rules:

(1) The pre-research server 10.2.0.1 cannot access the SSH service by using the forwarding device S2.

Second rule B1: SrcAddr:10.2.0.1:{ }, where content in { } is empty, which means "discarding."

(2) A pre-research employee cannot access the SSH service by using the forwarding device S2.

Second rule B2: DstPort:22:{ }.

(3) A pre-research employee accesses the external network by using the forwarding device S2.

Second rule B3: SrcAddr:10.2.0.0/16:{S2}.

It may be understood that it can be learned from the description of the first control policy, priorities of the first rules are sequentially A1>A2>A3; and it can be learned from the description of the second control policy, priorities of the second rules are sequentially B1>B2>B3.

To achieve an effect of complete coverage, a matching rule whose priority is the lowest may be added to each of the first rule and the second rule, where a matching field of the matching rule is a wildcard character, and an action of the matching rule is discarding. Specifically, for example, a first matching rule is added as a first rule $A_4$:*:{ }, where the first rule indicates that all packets that do not match matching fields of the first rules A1, A2, and A3 are to be discarded; and a second matching rule is added as a second rule $B_4$:*:{ }, where the second rule indicates that all packets that do not match matching fields of the second rules B1, B2, and $B_3$ are to be discarded.

220: The controller performs negation on each first rule to obtain a first negation rule, performs negation on each second rule to obtain a second negation rule, and generates a corresponding first execution rule by using each first negation rule and each second negation rule according to a rule synthesis principle, where the rule synthesis principle includes: forming the first execution rule by using the following: an intersection between a matching field of a first negation rule and a matching field of a second negation rule that are of a same matching field type or a union between a matching field of a first negation rule and a matching field of a second negation rule that are of different matching field types, and an intersection between an action of the first negation rule and an action of the second negation rule; and using a first execution rule, in which there is no intersection between the matching field of the first negation rule and the matching field of the second negation rule that are of the same matching field type, as an invalid rule.

The controller performs negation on the foregoing four first rules to obtain four first negation rules. Performing negation on the first rule is keeping the matching field of the first rule unchanged and performing negation on the action of the first rule. It may be understood that a set of all actions of a control policy is a universal set of actions that are obtained by decomposing the control policy, and therefore, performing negation on an action of the control policy is executing a remaining action in the control policy except the action. If an action of a rule obtained by decomposing a control policy is { }, the action represents "discarding", that is, none of actions in the control policy to which the rule belongs is to be executed, and therefore, performing negation is executing all the actions in the control policy to which the rule belongs. For example, the action of the first rule obtained by decomposing the first control policy is { }, and performing negation on the action of the first rule is executing all the actions in the first control policy, that is, going to S1. Specific details are as follows:

First negation rule C1: SrcAddr:10.0.0.1:{S1}, where {S1} means going to S1.

First negation rule C2: DstPort:80:{S1}.

First negation rule $C_3$: SrcAddr:10.0.0.0/8:$\{\overline{S1}\}$, where $\{\overline{S1}\}$ means not going to S1.

First negation rule $C_4$: *:{S1}.

The controller performs negation on the foregoing four second rules to obtain four second negation rules. Performing negation on the second rule is keeping the matching field of the second rule unchanged and performing negation on the action of the second rule. Similarly, if the action of the second rule is { }, performing negation is executing all the actions in the second control policy, that is, going to S2. Specific details are as follows.

Second negation rule D1: SrcAddr:10.2.0.1:{S2}, where {S2} means going to S2.

Second negation rule D2: DstPort:22:{S2}.

Second negation rule $D_3$: SrcAddr:10.2.0.0/16:$\{\overline{S2}\}$, where $\{\overline{S2}\}$ means not going to S2.

Second negation rule $D_4$:*:{S2}.

A priority of each first negation rule is the same as a priority of the corresponding first rule, and a priority of each second negation rule is the same as a priority of the corresponding second rule.

The controller combines, in pair, each of the four first negation rules C1, C2, $C_3$, and $C_4$ with each of the four second negation rules D1, D2, $D_3$, and $D_4$ according to the rule synthesis principle, to generate 16 first execution rules. Priorities of the first execution rules are sorted according to priorities of two rules that synthesize each of the first execution rules. Specifically, it may be defined as that the priorities of the first execution rules are first sorted according to the priorities of the first rules that are obtained by decomposing the first control policy whose priority is relatively high, and then when the priorities of the first rules are the same, the priorities of the first execution rules are sorted according to the priorities of the second rules that are obtained decomposing the second control policy whose priority is relatively low. For example, the obtained first execution rules are C1D1, C1D2, C2D1, $C_3$D2, $C_3$$D_4$, and $C_4$D1, and priorities are sequentially C1D1>C1D2>C2D1>$C_3$D2>$C_3$$D_4$>$C_4$D1.

It may be understood that the controller may implement, in various manners, paired combinations of all the first and second rules. To enable the priorities of the generated first execution rules to be sorted according to a sequence of matrix elements, the paired combinations are implemented in the following by means of matrix multiplication.

Specifically, the controller uses each first negation rule as an element and performs arrangement according to a priority sequence of the first rules to constitute a first matrix $\overline{P1}$, where the first matrix $\overline{P1}$ is a column matrix; and uses each second negation rule as an element and performs arrangement according to a priority sequence of the second rules to constitute a second matrix $\overline{P2}$, where the second matrix $\overline{P2}$ is a row matrix. Generally, a rule matrix of a control policy whose priority is higher is used as a column matrix. In this embodiment, the priority of the first control policy is higher than that of the second control policy, and therefore, the first matrix is a column matrix, and the second matrix is a row matrix.

The first matrix is multiplied by the second matrix, to obtain a first execution rule matrix that is constituted by multiplying, in pair, each first rule of the first matrix by each second rule of the second matrix:

$$\overline{P1} \times \overline{P2} = \begin{bmatrix} C1 \\ C2 \\ C3 \\ C4 \end{bmatrix} \times [D1, D2, D3, D4] = \begin{bmatrix} C1D1, C2D1, C3D1, C4D1 \\ C1D2, C2D2, C3D2, C4D2 \\ C1D3, C2D3, C3D3, C4D3 \\ C1D4, C2D4, C3D4, C4D4 \end{bmatrix}.$$

The first execution rule is generated according to the foregoing rule synthesis principle by using each pair of the first rule and the second rule that are multiplied and that are in the first execution rules. The rule synthesis principle includes: if a matching field of the first negation rule and a matching field of the second negation rule are of a same type, determining whether there is an intersection between the matching field of the first negation rule and the matching field of the second negation rule. If there is no intersection between the matching field of the first negation rule and the matching field of the second negation rule, a rule synthesized by the first negation rule and the second negation rule is an invalid rule; or if there is an intersection between a first matching field of the first negation rule and a second matching field of the second negation rule, the intersection between the matching field of the first negation rule and the matching field of the second negation rule and an intersection between an action of the first negation rule and an action of the second negation rule form a valid first execution rule. If a matching field of the first negation rule and a matching field of the second negation rule are of different types, a union between the matching field of the first negation rule and the matching field of the second negation rule and an intersection between an action of the first negation rule and an action of the second negation rule form a valid first execution rule. Certainly, in another application embodiment, the rule synthesis principle may further include: if no intersection is obtained by performing negation on the intersection between the action of the first negation rule and the action of the second negation rule, also using, the rule synthesized by the first negation rule and the second negation rule, as an invalid rule.

It may be understood that in the foregoing, the first execution rule is formed by using the intersection or the union between the matching field of the first negation rule and the matching field of the second negation rule and the intersection between the action of the first negation rule and the action of the second negation rule, which does not mean that the first execution rule is limited to including only the matching field and the action. In an embodiment in which the first and second rules further include parts in addition to the matching field and the action, the first execution rule definitely also includes other corresponding parts, and for a specific synthesis principle of the other parts, an intersection or a union of the other parts may be acquired according to an actual situation.

Specifically.

For C1D1, the first negation rule C1 is: SrcAddr:10.0.0.1:{S1}, the second negation rule D1 is: SrcAddr:10.2.0.1:{S2}, a matching field of the first negation rule C1 is an IP address 10.0.0.1, and a matching field of the second negation rule D1 is an IP address 10.2.0.1. Although the two matching fields are of a same type, there is no intersection between the two matching fields; therefore, C1D1 is an invalid rule.

For C1D2, the first negation rule C1 is: SrcAddr:10.0.0.1:{S1}, the second negation rule D2 is: DstPort:22:{S2}, the matching field of the first negation rule C1 is the IP address 10.0.0.1, and a matching field of the second negation rule D2 is a port address 22. The two matching fields are of different types; therefore, a union between the matching field of the first negation rule C1 and the matching field of the second negation rule D2, and an intersection between an action of the first negation rule C1 and an action of the second negation rule D2 are acquired for C1D2, and C1D2 is 10.0.0.1,22:{S1 ∩ S2}.

For C1D3, the first negation rule C1 is: SrcAddr:10.0.0.1:{S1}, the second negation rule D3 is: SrcAddr:10.2.0.0/16:{$\overline{S2}$}, the matching field of the first negation rule C1 is the IP address 10.0.0.1, and a matching field of the second negation rule D3 is 10.2.0.0/16 (10.2.0.1 to 10.2.255.255). The two matching fields are of a same type, but there is no intersection between the IP address 10.0.0.1 and the network segment 10.2.0.0/16; therefore, C1D3 is an invalid rule.

For C1D4, the first negation rule C1 is: SrcAddr:10.0.0.1:{S1}, the second negation rule D4 is: *:{S2}, the matching field of the first negation rule C1 is the IP address 10.0.0.1, and a matching field of the second negation rule D4 is a wildcard character *. The two matching fields are of a same type; therefore, an intersection between the matching field of the first negation rule C1 and the matching field of the second negation rule D4, and an intersection between the action of the first negation rule C1 and an action of the second negation rule D4 are acquired for C1D4, and C1D4 is 10.0.0.1:{S1∩S2}.

For C2D1, the first negation rule C2 is: DstPort:80:{S1}, the second negation rule D1 is: SrcAddr:10.2.0.1:{S2}, a matching field of the first negation rule C2 is a port address 80, and the matching field of the second negation rule D1 is the IP address 10.2.0.1. The two matching fields are of different types; therefore, a union between the matching field of the first negation rule C2 and the matching field of the second negation rule D1, and an intersection between an action of the first negation rule C2 and an action of the second negation rule D1 are acquired for C2D1, and C2D1 is 10.2.0.1,80:{S∩S2}.

For C2D2, the first negation rule C2 is: DstPort:80:{S1}, the second negation rule D2 is: DstPort:22:{S2}, the matching field of the first negation rule C2 is the port address 80, and the matching field of the second negation rule D2 is the port address 22. Although the two matching fields are of a same type, there is no intersection between the two matching fields; therefore, C2D2 is an invalid rule.

For C2D3, the first negation rule C2 is: DstPort:80:{S1}, the second negation rule $D_3$ is: SrcAddr:10.2.0.0/16:{S2}, the matching field of the first negation rule C2 is the port address 80, and the matching field of the second negation rule $D_3$ is 10.2.0.0/16 (10.2.0.1 to 10.2.255.255). The two matching fields are of different types; therefore, a union between the matching field of the first negation rule C2 and the matching field of the second negation rule $D_3$, and an intersection between the action of the first negation rule C2 and an action of the second negation rule $D_3$ are acquired for C2D3, and C2D3 is 10.2.0.06,80:{S1∩$\overline{S2}$}.

For C2D4, the first negation rule C2 is: DstPort:80:{S1}, the second negation rule $D_4$ is: *:{S2}, the matching field of the first negation rule C2 is the port address 80, and the matching field of the second negation rule $D_4$ is the wildcard character *. The two matching fields are of a same type; therefore, an intersection between the matching field of the first negation rule C2 and the matching field of the second negation rule $D_4$, and an intersection between the action of the first negation rule C2 and the action of the second negation rule $D_4$ are acquired for C2D4, and C2D4 is 80:{ sin S2}.

For $C_3D1$, the first negation rule $C_3$ is: SrcAddr:10.0.0.0/8:{$\overline{S1}$}, the second negation rule $D_1$ is: SrcAddr:10.2.0.1:{S2}, a matching field of the first negation rule $C_3$ is a network segment address 10.0.0.0/8 (10.0.0.0 to 10.255.255.255), and the matching field of the second negation rule D1 is the IP address 10.2.0.1. The two matching fields are of a same type, the IP address 10.2.0.1 belongs to the network segment address 10.0.0.0/8 (10.0.0.0 to 10.255.255.255), that is, there is an intersection between the two matching fields; therefore, an intersection between the matching field of the first negation rule $C_3$ and the matching field of the second negation rule D1, and an intersection between an action of the first negation rule $C_3$ and the action of the second negation rule D1 are acquired for $C_3$D1, and $C_3$D1 is 10.2.0.1:{$\overline{S1}$∩S2}.

For $C_3$D2, the first negation rule $C_3$ is: SrcAddr:10.0.0.0/8:{S1}, the second negation rule D2 is: DstPort:22:{S2}, the matching field of the first negation rule $C_3$ is the network segment address 10.0.0.0/8 (10.0.0.0 to 10.255.255.255), and the matching field of the second negation rule D2 is the port address 22. The two matching fields are of different types; therefore, a union between the matching field of the first negation rule $C_3$ and the matching field of the second negation rule D2, and an intersection between the action of the first negation rule $C_3$ and the action of the second negation rule D2 are acquired for $C_3$D2, and $C_3$D2 is 10.0.0.0/8,22:{$\overline{S1}$∩S2}.

For $C_3D_3$, the first negation rule $C_3$ is: SrcAddr:10.0.0.0/8:{$\overline{S1}$}, the second negation rule $D_3$ is: SrcAddr:10.2.0.0/16:{$\overline{S2}$}, the matching field of the first negation rule $C_3$ is the network segment address 10.0.0.0/8 (10.0.0.0 to 10.255.255.255), and the matching field of the second negation rule $D_3$ is 10.2.0.0/16 (10.2.0.1 to 10.2.255.255). The two matching fields are of a same type, the network segment address 10.2.0.0/16 (10.2.0.1 to 10.2.255.255) belongs to the network segment address 10.0.0.0/8 (10.0.0.0 to 10.255.255.255); therefore, an intersection between the matching field of the first negation rule $C_3$ and the matching field of the second negation rule $D_3$, and an intersection between the action of the first negation rule $C_3$ and the action of the second negation rule $D_3$ are acquired for $C_3D_3$, and $C_3D_3$ is 10.2.0.0/16:$\{\overline{S1 \cap S2}\}$.

For $C_3D_4$, the first negation rule $C_3$ is: SrcAddr:10.0.0.0/8:$\{\overline{S1}\}$, the second negation rule $D_4$ is: *:$\{\overline{S2}\}$, the matching field of the first negation rule $C_3$ is the network segment address 10.0.0.0/8 (10.0.0.0 to 10.255.255.255), and the matching field of the second negation rule $D_4$ is the wildcard character *. The two matching fields are of a same type; therefore, an intersection between the matching field of the first negation rule $C_3$ and the matching field of the second negation rule $D_4$, and an intersection between the action of the first negation rule $C_3$ and the action of the second negation rule $D_4$ are acquired for $C_3D_4$, and $C_3D_4$ is 10.0.0.0/8:$\{\overline{S1 \cap S2}\}$.

For $C_4D1$, the first negation rule $C_4$ is: *:$\{\overline{S1}\}$, the second negation rule D1 is: SrcAddr:10.2.0.1:$\{\overline{S2}\}$, a matching field of the first negation rule $C_4$ is a wildcard character *, and the matching field of the second negation rule D1 is the IP address 10.2.0.1. The two matching fields are of a same type, the IP address 10.2.0.1 belongs to the wildcard character *, that is, there is an intersection between the two matching fields; therefore, an intersection between the matching field of the first negation rule $C_4$ and the matching field of the second negation rule $D_1$, and an intersection between an action of the first negation rule $C_4$ and the action of the second negation rule D1 are acquired for $C_4D1$, and $C_4D1$ is 10.2.0.1:$\{\overline{S1 \cap S2}\}$.

For $C_4D2$, the first negation rule $C_4$ is: *:$\{\overline{S1}\}$, the second negation rule D2 is: DstPort:22:$\{\overline{S2}\}$, the matching field of the first negation rule $C_4$ is the wildcard character *, and the matching field of the second negation rule D2 is the port address 22. The two matching fields are of a same type; therefore, an intersection between the matching field of the first negation rule $C_4$ and the matching field of the second negation rule D2, and an intersection between the action of the first negation rule $C_4$ and the action of the second negation rule D2 are acquired for $C_4D2$, and $C_4D2$ is 22$\{\overline{S1 \cap S2}\}$.

For $C_4D_3$, the first negation rule $C_4$ is: *:$\{\overline{S1}\}$, the second negation rule $D_3$ is: SrcAddr:10.2.0.0/16:$\{\overline{S2}\}$, the matching field of the first negation rule $C_4$ is the wildcard character *, and the matching field of the second negation rule $D_3$ is 10.2.0.0/16 (10.2.0.1 to 10.2.255.255). The two matching fields are of a same type; therefore, an intersection between the matching field of the first negation rule $C_4$ and the matching field of the second negation rule $D_3$, and an intersection between the action of the first negation rule $C_4$ and the action of the second negation rule $D_3$ are acquired for $C_4D_3$, and $C_4D_3$ is 10.2.0.0/16:$\{S1 \cap \overline{S2}\}$.

For $C_4D_4$, the first negation rule $C_4$ is: *:$\{\overline{S1}\}$, the second negation rule $D_4$ is: *:$\{\overline{S2}\}$, the matching field of the first negation rule $C_4$ is the wildcard character *, and the matching field of the second negation rule $D_4$ is the wildcard character *. The two matching fields are of a same type; therefore, an intersection between the matching field of the first negation rule $C_4$ and the matching field of the second negation rule $D_4$, and an intersection between the action of the first negation rule $C_4$ and the action of the second negation rule $D_4$ are acquired for $C_4D_4$, and $C_4D_4$ is *:$\{S1 \cap S2\}$.

In the foregoing first execution rule matrix, the priorities of the first execution rules are first sorted according to a column sequence of the matrix, and priorities of first execution rules in a same column are sorted according to a row sequence of the matrix. For example, the priorities of the first execution rules in the first execution rule matrix are: the first column>the second column>the third column>the fourth column . . . ; and priorities of first execution rules in a same column are: the first row>the second row>the third row>the fourth row . . . . Therefore, a priority of the first execution rule C1D1 is the highest, a priority of the first execution rule C1D$_2$ is the second highest, . . . , and a priority of the first execution rule $C_4D_4$ is the lowest.

230: The controller deletes the invalid rule, uses a remaining one of the first execution rules as a valid first execution rule, performs negation on each valid first execution rule, and converts, according to a protocol supported by the first forwarding device, each valid first execution rule on which negation has been performed into a corresponding forwarding entry of the first forwarding device.

A principle of performing negation on a remaining valid first execution rule is keeping a matching field unchanged and performing negation on an action, where:

$\overline{\overline{S1} \cap \overline{S2}} = \overline{\overline{S1} \cup \overline{S2}} = \{\ \}$, $\overline{\overline{S1} \cap S2} = \overline{\overline{S1}} \cup \overline{S2} = S2$, $\overline{S1 \cap \overline{S2}} = \overline{S1} \cup \overline{\overline{S2}} = S1$, and $\overline{S1 \cap S2} = \overline{S1} \cup \overline{S2} = S1, S2$.

In the foregoing first execution rule matrix, because C1D1 is an invalid rule, C1D1 is deleted, and negation does not need to be performed on C1D1.

Negation is performed on C1D2 (10.0.0.1,22:$\{\overline{S1 \cap S2}\}$), so that a matching field is kept unchanged, and negation is performed on an action, so as to obtain that a negation result of the first execution rule is 10.0.0.1,22:$\{\overline{\overline{S1 \cap S2}}\}$, where $\overline{S1 \cap S2} = \{\ \}$. Therefore, the negation result of the first execution rule may be simplified to 10.0.0.1,22:$\{\ \}$.

Because C1D$_3$ is an invalid rule, C1D$_3$ is deleted, and negation does not need to be performed on C1D$_3$.

Negation is performed on C1D$_4$ (10.0.0.1:$\{\overline{S1 \cap S2}\}$), so that a matching field is kept unchanged, and negation is performed on an action, so as to obtain that a negation result of the first execution rule is 10.0.0.1:$\{\overline{S1 \cap S2}\}$, where $\overline{S1 \cap S2} = \{\ \}$. Therefore, the negation result of the first execution rule may be simplified to 10.0.0.1:$\{\ \}$.

Negation is performed on C2D1 (10.2.0.1,80:$\{\overline{S1 \cap S2}\}$), so that a matching field is kept unchanged, and negation is performed on an action, so as to obtain that a negation result of the first execution rule is 10.2.0.1,80:$\{\overline{S1 \cap S2}\}$, where $\overline{S1 \cap S2} = \{\ \}$. Therefore, the negation result of the first execution rule may be simplified to 10.2.0.1,80:$\{\ \}$.

Because C2D2 is an invalid rule, C2D2 is deleted, and negation does not need to be performed on C2D2.

Negation is performed on C2D$_3$ (10.2.0.0/16.80:$\{\overline{S1 \cap S2}\}$), so that a matching field is kept unchanged, and negation is performed on an action, so as to obtain that a negation result of the first execution rule is 10.2.0.0/16,80:$\{\overline{\overline{S1 \cap S2}}\}$, where $\overline{\overline{S1} \cap S2} = S2$. Therefore, the negation result of the first execution rule may be simplified to 10.2.0.0/16,80:$\{S2\}$.

Negation is performed on C2D$_4$ (80:$\{\overline{S1 \cap S2}\}$), so that a matching field is kept unchanged, and negation is performed on an action, so as to obtain that a negation result of the first execution rule is 80:$\{\overline{S1 \cap S2}\}$, where $\overline{S1 \cap S2} = \{\ \}$. Therefore, the negation result of the first execution rule may be simplified to 80:$\{\ \}$.

Negation is performed on C$_3$D1 (10.2.0.1:$\{\overline{S1 \cap S2}\}$), so that a matching field is kept unchanged, and negation is performed on an action, so as to obtain that a negation result of the first execution rule is 10.2.0.1:$\{\overline{S1 \cap S2}\}$, where $\overline{S1 \cap S2}$=S1. Therefore, the negation result of the first execution rule may be simplified to 10.2.0.1:{S1}.

Negation is performed on $C_3D_2$ (10.0.0.0/8,22: $\{\overline{S1 \cap S2}\}$), so that a matching field is kept unchanged, and negation is performed on an action, so as to obtain that a negation result of the first execution rule is 10.0.0.0/8,22: $\{\overline{S1 \cap S2}\}$, where $\overline{S1 \cap S2}$=S1. Therefore, the negation result of the first execution rule may be simplified to 10.0.0.0/8, 22:{S1}.

Negation is performed on $C_3D_3$ (10.2.0.0/16:$\{\overline{S1 \cap S2}\}$), so that a matching field is kept unchanged, and negation is performed on an action, so as to obtain that a negation result of the first execution rule is 10.2.0.0/16:$\{\overline{S1 \cap S2}\}$, where $\overline{S1 \cap S2}$=S1, S2. Therefore, the negation result of the first execution rule may be simplified to 10.2.0.0/16:{S1, S2}.

Negation is performed on $C_3D_4$ (10.0.0.0/8:$\{\overline{S1 \cap S2}\}$), so that a matching field is kept unchanged, and negation is performed on an action, so as to obtain that a negation result of the first execution rule is 10.0.0.0/8:$\{S1 \cap S2\}$, where $\overline{S1 \cap S2}$=S1. Therefore, the negation result of the first execution rule may be simplified to 10.0.0.0/8:{S1}.

Negation is performed on $C_4D_1$ (10.2.0.1:$\{S1 \cap S2\}$), so that a matching field is kept unchanged, and negation is performed on an action, so as to obtain that a negation result of the first execution rule is 10.2.0.1:$\{\overline{S1 \cap S2}\}$, where $\overline{S1 \cap S2}$={ }. Therefore, the negation result of the first execution rule may be simplified to 10.2.0.1:{ }.

Negation is performed on $C_4D_2$ (22:$\{S1 \cap S2\}$), so that a matching field is kept unchanged, and negation is performed on an action, so as to obtain that a negation result of the first execution rule is 22:$\{\overline{S1 \cap S2}\}$, where $\overline{S1 \cap S2}$={ }. Therefore, the negation result of the first execution rule may be simplified to 22:{ }.

Negation is performed on $C_4D_3$ (10.2.0.0/16:$\{S1 \cap S2\}$), so that a matching field is kept unchanged, and negation is performed on an action, so as to obtain that a negation result of the first execution rule is 10.2.0.0/16:$\{\overline{S1 \cap S2}\}$, where $\overline{S1 \cap S2}$=S2. Therefore, the negation result of the first execution rule may be simplified to 10.2.0.0/16:{S2}.

Negation is performed on $C_4D_4$ (*:$\{S1 \cap S2\}$), so that a matching field is kept unchanged, and negation is performed on an action, so as to obtain that a negation result of the first execution rule is *:$\{\overline{S1 \cap S2}\}$, where $\overline{S1 \cap S2}$={ }. Therefore, the negation result of the first execution rule may be simplified to *:{ }.

The controller converts, according to a protocol supported by the first forwarding device S0, the valid first execution rule on which negation has been performed and that is in the foregoing first execution rule matrix into a corresponding forwarding entry, so that the first forwarding device S0 forwards a packet according to the forwarding entry. The forwarding entry may be a flow entry defined in the Openflow protocol, or may be a forwarding entry defined in another protocol, which is not specifically limited herein. Moreover, a sequence of priorities of forwarding entries is the same as that of priorities of corresponding first execution rules of the forwarding entries, so that after receiving a packet, the first forwarding device S0 forwards the packet to another forwarding device such as S1 or S2 according to a forwarding entry whose priority is the highest among forwarding entries that match the packet.

When a conflicting control policy further includes a third control policy, that is, when the third control policy and the first and second control policies all act on the first forwarding device S0, the controller receives the third control policy, and decomposes the third control policy into k third rules, where k is a natural number; performs negation on the valid first execution rules to obtain first negation execution rules, and performs negation on the third rules to obtain third negation rules; uses each first negation execution rule as an element and performs arrangement according to a priority sequence of the first execution rules to constitute a third matrix $\overline{P3}$, where the third matrix $\overline{P3}$ is a column matrix; uses each third negation rule as an element and performs arrangement according to a priority sequence of the third rules to constitute a fourth matrix $\overline{P4}$, where the fourth matrix $\overline{P4}$ is a row matrix; multiplies the third matrix $\overline{P3}$ by the fourth matrix $\overline{P4}$ to obtain a second execution rule matrix; generates, according to a rule synthesis principle similar to the foregoing rule synthesis principle, a corresponding second execution rule by using each pair of the first negation execution rule and the third negation rule that are multiplied and that are in the second execution rule matrix; and deletes an invalid rule, performs negation on each remaining second execution rule, and converts, according to the protocol supported by the first forwarding device S0, each remaining second execution rule on which negation has been performed into a corresponding forwarding entry of the first forwarding device S0. Content of the rule synthesis principle is similar to content of the foregoing rule synthesis principle: the second execution rule is formed by using an intersection between a matching field of a first negation execution rule and a matching field of a third negation rule that are of a same matching field type or a union between a matching field of a first negation execution rule and a matching field of a third negation rule that are of different matching field types, and an intersection between an action of the first negation execution rule and an action of the third negation rule; and a second execution rule in which there is no intersection between the matching field of the first negation execution rule and the matching field of the third negation rule that are of the same matching field type is used as an invalid rule. A specific process thereof is similar to the foregoing process, and details are not described herein.

In the foregoing solution, a first control policy is decomposed into m first rules, a second control policy is decomposed into n second rules, and each first rule and each second rule are synthesized according to a rule synthesis principle. Because in the rule synthesis principle, a first execution rule in which there is no intersection between a matching field of a first negation rule and a matching field of a second negation rule that are of a same matching field type is used as an invalid rule, and the invalid rule defined above is a rule part that causes a conflict between the first and second control policies, a case in which a conflicting rule exists between the first control policy and the second control policy is avoided by deleting an invalid rule in which a conflict exists, that is, a policy conflict problem is resolved, so that in first forwarding device, both the first control policy and the second control policy can be executed.

Figure 3:
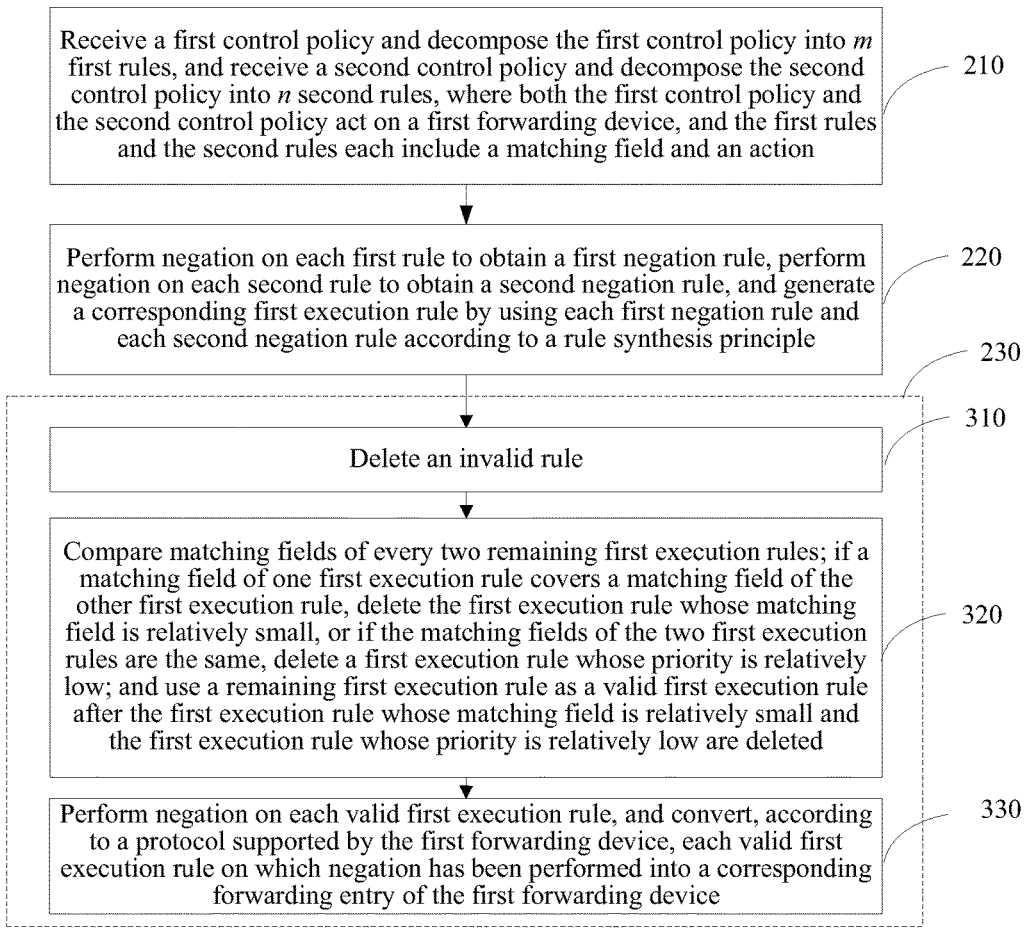
FIG. 3 is a flowchart of another implementation manner of a policy conflict resolution method according to this application.

Referring to FIG. 3, FIG. 3 is a flowchart of an implementation manner of a policy conflict resolution method according to this application. This implementation manner is the same as the implementation manner in step 210 and 220 shown in FIG. 2, and a difference lies in that step 230 specifically includes.

310: The controller deletes the invalid rule.

320: The controller compares matching fields of every two remaining first execution rules; if a matching field of one first execution rule covers a matching field of the other first execution rule, deletes the first execution rule whose matching field is relatively small, or if the matching fields of the two first execution rules are the same, deletes a first execution rule whose priority is relatively low; and uses a remaining first execution rule as the valid first execution rule after the first execution rule whose matching field is relatively small and the first execution rule whose priority is relatively low are deleted.

The controller compares matching fields of every two remaining first execution rules after the invalid rule in the first execution rule matrix is deleted, or certainly, may compare matching fields of only every two first execution rules whose matching fields are the same. For two matching fields, a matching field having more matching conditions and having a same matching condition is smaller. For example, the matching field of the first execution rule C1D2 is 10.0.0.1,22, and has two matching conditions, which are as follows: an IP address is 10.0.0.1 and a port is 22. The matching field of the first execution rule $C1D_4$ is 10.0.0.1, and has only one matching condition, where the matching condition is the same as one matching condition of C1D2. That is, the matching field 10.0.0.1,22 of the first execution rule C1D2 is covered by the matching field 10.0.0.1 of the first execution rule $C1D_4$. That is, the matching field of the first execution rule C1D2 is relatively small. Therefore, the first execution rule C1D2 may be deleted. It is found that the matching field of the first execution rule $C_3D1$ is 10.2.0.1, which covers the matching field 10.2.0.1,80 of the first execution rule C2D1. That is, the matching field of the first execution rule C2D1 is relatively small. Therefore, the first execution rule C2D1 may be deleted. It is found that the matching field of the first execution rule $C_3D1$ is 10.2.0.1, which is the same as the matching field 10.2.0.1 of the first execution rule $C_4D1$, where that matching fields are the same means that matching conditions are completely the same, or may be that matching conditions of two matching fields include a same port number and one matching field includes only the foregoing port number as a matching condition. A priority of the first execution rule $C_3D1$ is relatively higher; therefore, the first execution rule $C_4D1$ is deleted. Similarly, it is found that the matching field of the first execution rule $C_3D_3$ is the same as the matching field of the first execution rule $C_4D_3$, and a priority of the first execution rule $C_3D_3$ is higher than a priority of the first execution rule $C_4D_3$. Therefore, the first execution rule $C_4D_3$ is deleted. It is found that the matching field of the first execution rule $C_4D2$ is 22, which includes only a port number, and the matching field of the first execution rule $C_3D2$ is 10.0.0.0/8,22, which not only includes the port number, and matching fields of the two first execution rules are the same. A priority of the first execution rule $C_3D2$ is higher than a priority of the first execution rule $C_4D2$; therefore the first execution rule $C_4D2$ is deleted.

Remaining first execution rules are used as valid first execution rules, and negation is performed to obtain: R1: 10.0.0.1:{ }, which means that the server of the research and development department cannot access the external network by using S1, where because the matching field 10.0.0.1 belongs to the first control policy, that is, the rule R1 belongs to the first control policy, an action { } of R1 means all actions of not going to the first control policy, that is, not going to S1. Discarding actions of the following rules are similar to the foregoing description; R2: 10.2.0.0/16,80: {S2}, which means that an employee of the pre-research group accesses the external network from S2; $R_3$: 80:{ }, which means that an employee of the research and development department cannot access the external network by using S1; $R_4$: 10.2.0.1:{S1}, which means that the server of the pre-research group accesses the internal network by using S1; $R_5$: 10.0.0.0/8,22:{S1}, which means that an employee of the research and development department accesses the internal network from S1; R6: 10.2.0.0/16:{S1, S2}, which means that an employee of the pre-research group accesses the external network by using S2, and accesses the internal network from S1; $R_7$: 10.0.0.0/8:{S1}, which means that an employee of the research and development department accesses the internal network from S1; and R8: *:{ }, which means discarding a packet when the packet cannot match matching fields of the first execution rules R1 to R8.

After the foregoing optimization processing, neither of the matching fields of the every two remaining valid first execution rules completely overlap, and forwarding may be performed according to priorities of entries that are obtained by means of conversion, which avoids a conflict and further resolves a policy conflict.

330: The controller performs negation on each valid first execution rule, and converts, according to a protocol supported by the first forwarding device, each valid first execution rule on which negation has been performed into a corresponding forwarding entry of the first forwarding device.

When a conflicting control policy further includes a third control policy, that is, when the third control policy and the first and second control policies all act on the first forwarding device S0, the controller generates a second execution rule according to a process of the foregoing implementation manner, and converts the second execution rule into a corresponding forwarding entry of the first forwarding device S0; and details are not described herein.

In this solution, for a case in which multiple applications or multiple users on an SDN have a policy conflict, complete matching item covering space is defined by using a simple and clear rule synthesis principle, and an invalid rule causing the conflict is deleted, which resolves a conflict problem between first and second control policies. Moreover, priorities are followed, and rule priorities and matrix elements are combined, so that original policy priorities are not affected. In addition, discovery of a matching item covering problem and an action conflict problem can be optimized, and these two conflicts are resolved, thereby generating efficient forwarding rules without a conflict.

Figure 4:
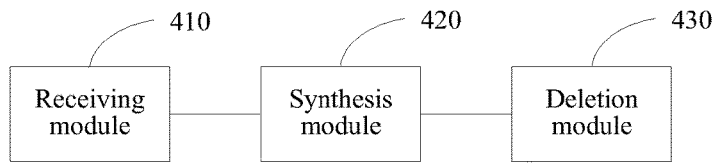
FIG. 4 is a schematic structural diagram of an implementation manner of a policy conflict resolution apparatus according to this application.

Referring to FIG. 4, FIG. 4 is a schematic structural diagram of an implementation manner of a policy conflict resolution apparatus according to this application. The policy conflict resolution apparatus in this implementation manner includes a receiving module 410, a synthesis module 420, and a deletion module 430.

The receiving module 410 is configured to receive a first control policy and decompose the first control policy into m first rules, and receive a second control policy and decompose the second control policy into n second rules, where m and n are natural numbers, both the first control policy and the second control policy act on a first forwarding device, and the first rules and the second rules each include a matching field and an action; and the receiving module 410 sends the m first rules and the n second rules to the synthesis module 420.

The synthesis module 420 is configured to receive the m first rules and the n second rules, perform negation on each first rule to obtain a first negation rule, perform negation on each second rule to obtain a second negation rule, and generate a corresponding first execution rule by using each first negation rule and each second negation rule according to a rule synthesis principle, where the rule synthesis principle includes: forming the first execution rule by using the following: an intersection between a matching field of a first negation rule and a matching field of a second negation rule that are of a same matching field type or a union between a matching field of a first negation rule and a matching field of a second negation rule that are of different matching field types, and an intersection between an action of the first negation rule and an action of the second negation rule; and using a first execution rule, in which there is no intersection between the matching field of the first negation rule and the matching field of the second negation rule that are of the same matching field type, as an invalid rule; and the synthesis module 420 sends the synthesized first execution rule to the deletion module 430. Optionally, the rule synthesis principle may further include: if no intersection is obtained by performing negation on the intersection between the action of the first negation rule and the action of the second negation rule, also using the rule, synthesized by the first negation rule and the second negation rule, as an invalid rule.

The deletion module 430 is configured to receive the synthesized first execution rule, delete the invalid rule, use a remaining one of the first execution rules as a valid first execution rule, perform negation on each valid first execution rule, and convert, according to a protocol supported by the first forwarding device, each valid first execution rule on which negation has been performed into a corresponding forwarding entry of the first forwarding device.

Optionally, performing negation on the first rule is keeping the matching field of the first rule unchanged and performing negation on the action of the first rule, and performing negation on the second rule is keeping the matching field of the second rule unchanged and performing negation on the action of the second rule.

Optionally, the synthesis module 420 is further configured to: use each first negation rule as an element and perform arrangement according to a priority sequence of the first rules to constitute a first matrix, where the first matrix is a column matrix; use each second negation rule as an element and perform arrangement according to a priority sequence of the second rules to constitute a second matrix, where the second matrix is a row matrix; multiply the first matrix by the second matrix to obtain a first execution rule matrix; and generate, according to the rule synthesis principle, the corresponding first execution rule by using each pair of the first negation rule and the second negation rule that are multiplied and that are in the first execution rule matrix, where priorities of the first execution rules of the first execution rule matrix are first sorted according to a column sequence of the matrix, and priorities of first execution rules in a same column are sorted according to a row sequence of the matrix.

Optionally, the synthesis module 420 is further configured to: after the first control policy is decomposed into the m first rules, add a first matching rule as a first rule whose priority is the lowest; and after the second control policy is decomposed into the n second rules, add a second matching rule as a second rule whose priority is the lowest, where matching fields of the first matching rule and the second matching rule are both wildcard characters, and actions of the first matching rule and the second matching rule are both discarding.

Optionally, the receiving module 410 is further configured to: receive a third control policy and decompose the third control policy into k third rules, where k is a natural number, and the third control policy and the first and second control policies all act on the first forwarding device; and the receiving module 410 sends the k third rules to the synthesis module 420.

The synthesis module 420 is further configured to: receive the k third rules; perform negation on each valid first execution rule to obtain each first negation execution rule, and perform negation on each third rule to obtain each third negation rule; use each first negation execution rule as an element and perform arrangement according to a priority sequence of the first execution rules to constitute a third matrix, where the third matrix is a column matrix; use each third negation rule as an element and perform arrangement according to a priority sequence of the third rules to constitute a fourth matrix, where the fourth matrix is a row matrix; multiply the third matrix by the fourth matrix to obtain a second execution rule matrix; generate, according to the rule synthesis principle, a corresponding second execution rule by using each pair of the first negation execution rule and the third negation rule that are multiplied and that are in the second execution rule matrix, where the rule synthesis principle further includes: forming the second execution rule by using the following: an intersection between a matching field of a first negation execution rule and a matching field of a third negation rule that are of a same matching field type or a union between a matching field of a first negation execution rule and a matching field of a third negation rule that are of different matching field types, and an intersection between an action of the first negation execution rule and an action of the third negation rule; and using a second execution rule, in which there is no intersection between the matching field of the first negation execution rule and the matching field of the third negation rule that are of the same matching field type, as an invalid rule; and the synthesis module 420 sends the synthesized second execution rule to the deletion module 430.

The deletion module 430 is configured to: receive the synthesized second execution rule, delete the invalid rule, perform negation on each remaining second execution rule, and convert, according to the protocol supported by the first forwarding device, each remaining second execution rule on which negation has been performed into a corresponding forwarding entry of the first forwarding device.

The policy conflict resolution apparatus in this implementation manner can perform the method shown in FIG. 2.

Optionally, the synthesis module is further configured to: after the invalid rule is deleted, compare matching fields of every two remaining first execution rules; if a matching field of one first execution rule covers a matching field of the other first execution rule, delete the first execution rule whose matching field is relatively small, or if the matching fields of the two first execution rules are the same, delete a first execution rule whose priority is relatively low; and use a remaining first execution rule as the valid first execution rule after the first execution rule whose matching field is relatively small and the first execution rule whose priority is relatively low are deleted.

When a conflicting control policy further includes a third control policy, that is, when the third control policy and the first and second control policies all act on the first forwarding device S0, the apparatus generates a second execution rule according to a process of the foregoing implementation manner, and converts the second execution rule into a corresponding forwarding entry of the first forwarding device S0; and details are not described herein.

The policy conflict resolution apparatus in this implementation manner can perform the method shown in FIG. 3.

In the foregoing solution, a first control policy is decomposed into m first rules, a second control policy is decomposed into n second rules, and each first rule and each second rule are synthesized according to a rule synthesis principle.

Because in the rule synthesis principle, a first execution rule in which there is no intersection between a matching field of a first negation rule and a matching field of a second negation rule that are of a same matching field type is used as an invalid rule, and the invalid rule defined above is a rule part that causes a conflict between the first and second control policies, a case in which a conflicting rule exists between the first control policy and the second control policy is avoided by deleting an invalid rule in which a conflict exists, that is, a policy conflict problem is resolved, so that in first forwarding device, both the first control policy and the second control policy can be executed.

Figure 5:
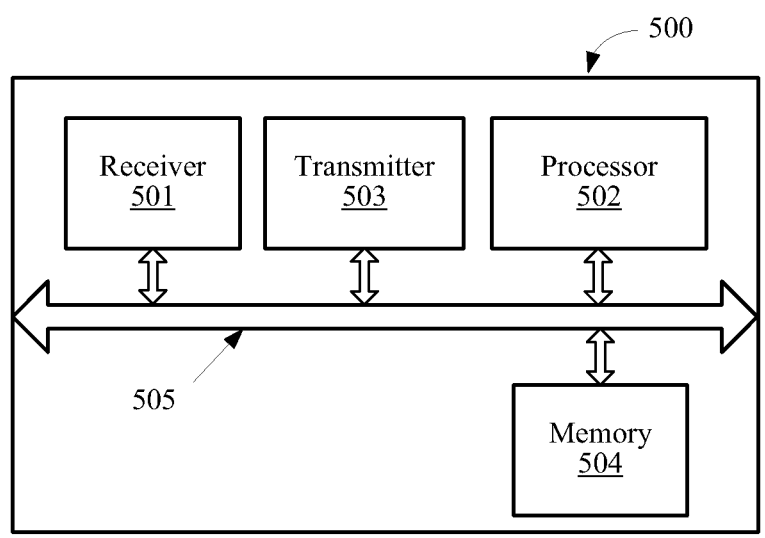
FIG. 5 is a schematic structural diagram of an implementation manner of a controller according to this application.

Referring to FIG. 5, FIG. 5 is a schematic structural diagram of an implementation manner of a controller according to this application. The controller 500 in this implementation manner includes a receiver 501, a processor 502, a transmitter 503, a memory 504, and a bus 505.

The receiver 501 is configured to receive a first control policy and a second control policy.

The processor 502 is configured to: decompose the first control policy into m first rules, and decompose the second control policy into n second rules, where m and n are natural numbers, both the first control policy and the second control policy act on a first forwarding device, and the first rules and the second rules each include a matching field and an action; perform negation on each first rule to obtain a first negation rule, perform negation on each second rule to obtain a second negation rule, and generate a corresponding first execution rule by using each first negation rule and each second negation rule according to a rule synthesis principle, where the rule synthesis principle includes: forming the first execution rule by using the following: an intersection between a matching field of a first negation rule and a matching field of a second negation rule that are of a same matching field type or a union between a matching field of a first negation rule and a matching field of a second negation rule that are of different matching field types, and an intersection between an action of the first negation rule and an action of the second negation rule; and using a first execution rule, in which there is no intersection between the matching field of the first negation rule and the matching field of the second negation rule that are of the same matching field type, as an invalid rule; and delete the invalid rule, use a remaining one of the first execution rules as a valid first execution rule, perform negation on each valid first execution rule, and convert, according to a protocol supported by the first forwarding device, each valid first execution rule on which negation has been performed into a corresponding forwarding entry of the first forwarding device.

The transmitter 503 is configured to send the forwarding entry.

The memory 504 may include a read only memory and a random access memory, and provides instructions and data to the processor 502. A part of the memory 504 may further include a non-volatile random access memory (NVRAM).

The memory 504 stores the following elements, executable modules or data structures, or a subset thereof, or an extension set thereof: operation instructions: including various operation instructions and used to implement various operations; and an operating system: including various system programs and used to implement various fundamental services and process a hardware-based task.

In this embodiment of the application, the processor 502 executes the foregoing operations by invoking the operation instructions (where the operation instructions may be stored in the operating system) stored in the memory 504.

The processor 502 may also be referred to as a CPU (Central Processing Unit). The memory 504 may include a read only memory and a random access memory, and provides instructions and data to the processor 502. A part of the memory 504 may further include a non-volatile random access memory (NVRAM). In a specific application, components of the controller 505 are coupled by using a bus system 505, and in addition to a data bus, the bus system 505 may further include a power bus, a control bus, a status signal bus, and the like. However, for clear description, various buses in the figure are marked as the bus system 505.

The methods disclosed in the foregoing embodiments of the application may be applied to the processor 502, or are implemented by the processor 502. The processor 502 may be an integrated circuit chip, and has a signal processing capability. In an implementation process, steps of the foregoing methods may be accomplished by using an integrated logic circuit of hardware in the processor 502 or an instruction in a form of software. The processor 502 may be a general purpose processor, a digital signal processor (DSP), an application-specific integrated circuit (ASIC), a field programmable gate array (FPGA), or another programmable logic device, discrete gate or transistor logical device, and discrete hardware component. The processor 502 may implement or perform methods, steps, and logical block diagrams disclosed in the embodiments of the application. The general purpose processor may be a microprocessor, or the processor may be any conventional processor, or the like. Steps of the methods disclosed with reference to the embodiments of the application may be directly performed and completed by a hardware decoding processor, or may be performed and completed by using a combination of hardware and software modules in a decoding processor. The software module may be located in a mature storage medium such as a random access memory, a flash memory, a read-only memory, a programmable read-only memory, an electrically-erasable programmable memory or a register in the field. The storage medium is located in the memory 504. The processor 502 reads information in the memory 504, and completes the steps of the foregoing methods in combination with hardware of the processor 502.

Optionally, performing negation on the first rule is keeping the matching field of the first rule unchanged and performing negation on the action of the first rule, and performing negation on the second rule is keeping the matching field of the second rule unchanged and performing negation on the action of the second rule.

Optionally, the processor 502 is further configured to: use each first negation rule as an element and perform arrangement according to a priority sequence of the first rules to constitute a first matrix, where the first matrix is a column matrix; use each second negation rule as an element and perform arrangement according to a priority sequence of the second rules to constitute a second matrix, where the second matrix is a row matrix; multiply the first matrix by the second matrix to obtain a first execution rule matrix; and generate, according to the rule synthesis principle, the corresponding first execution rule by using each pair of the first negation rule and the second negation rule that are multiplied and that are in the first execution rule matrix, where priorities of the first execution rules of the first execution rule matrix are first sorted according to a column sequence of the matrix, and priorities of first execution rules in a same column are sorted according to a row sequence of the matrix.

Optionally, the processor 502 is further configured to: after the first control policy is decomposed into the m first rules, add a first matching rule as a first rule whose priority is the lowest; and after the second control policy is decomposed into the n second rules, add a second matching rule as a second rule whose priority is the lowest, where matching fields of the first matching rule and the second matching rule are both wildcard characters, and actions of the first matching rule and the second matching rule are both discarding.

Optionally, the processor 502 is further configured to: after the invalid rule is deleted, compare matching fields of every two remaining first execution rules; if a matching field of one first execution rule covers a matching field of the other first execution rule, delete the first execution rule whose matching field is relatively small, or if the matching fields of the two first execution rules are the same, delete a first execution rule whose priority is relatively low; and use a remaining first execution rule as the valid first execution rule after the first execution rule whose matching field is relatively small and the first execution rule whose priority is relatively low are deleted.

Optionally, the receiver 501 is further configured to: receive a third control policy and decompose the third control policy into k third rules, where k is a natural number, and the third control policy and the first and second control policies all act on the first forwarding device. The processor 502 is further configured to: perform negation on each valid first execution rule to obtain each first negation execution rule, and perform negation on each third rule to obtain each third negation rule; use each first negation execution rule as an element and perform arrangement according to a priority sequence of the first execution rules to constitute a third matrix, where the third matrix is a column matrix; use each third negation rule as an element and perform arrangement according to a priority sequence of the third rules to constitute a fourth matrix, where the fourth matrix is a row matrix; multiply the third matrix by the fourth matrix to obtain a second execution rule matrix; generate, according to the rule synthesis principle, a corresponding second execution rule by using each pair of the first negation execution rule and the third negation rule that are multiplied and that are in the second execution rule matrix, where the rule synthesis principle further includes: forming the second execution rule by using the following: an intersection between a matching field of a first negation execution rule and a matching field of a third negation rule that are of a same matching field type or a union between a matching field of a first negation execution rule and a matching field of a third negation rule that are of different matching field types, and an intersection between an action of the first negation execution rule and an action of the third negation rule; and using a second execution rule, in which there is no intersection between the matching field of the first negation execution rule and the matching field of the third negation rule that are of the same matching field type, as an invalid rule; and delete the invalid rule, perform negation on each remaining second execution rule, and convert, according to the protocol supported by the first forwarding device, each remaining second execution rule on which negation has been performed into a corresponding forwarding entry of the first forwarding device.

In the foregoing solution, a first control policy is decomposed into m first rules, a second control policy is decomposed into n second rules, and each first rule and each second rule are synthesized according to a rule synthesis principle. Because in the rule synthesis principle, a first execution rule in which there is no intersection between a matching field of a first negation rule and a matching field of a second negation rule that are of a same matching field type is used as an invalid rule, and the invalid rule defined above is a rule part that causes a conflict between the first and second control policies, a case in which a conflicting rule exists between the first control policy and the second control policy is avoided by deleting an invalid rule in which a conflict exists, that is, a policy conflict problem is resolved, so that in first forwarding device, both the first control policy and the second control policy can be executed.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the implementation manners.

In addition, functional units in the implementation manners of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior aft, or all or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the implementation manners of this application. The foregoing storage medium includes: any medium that can store program code, such as a universal serial bus (USB) flash drive, a removable hard disk, a read-only memory (ROM), a random access memory (RAM), a magnetic disk, or an optical disc.

What is claimed is:

1. A method comprising:
receiving, by a processor, a first control policy;
decomposing the first control policy into m first rules;
receiving, by the processor, a second control policy;
decomposing the second control policy into n second rules, wherein m and n are natural numbers, wherein both the first control policy and the second control policy act on a first forwarding device, and wherein the first rules and the second rules each comprise a matching field and an action;
performing negation on the first rules to obtain first negation rules;

performing negation on the second rules to obtain second negation rules;

generating a corresponding first execution rule using the first negation rules and the second negation rules according to a rule synthesis principle, wherein the rule synthesis principle comprises forming the first execution rule using an intersection between a matching field of a first negotiation rule of the first negotiation rules and a second negotiation rule of the second negotiation rules that are of a same matching field type or a union between a matching field of the first negation rule and a matching field of the second negation rule that are of different matching field types, and an intersection between an action of the first negation rule and an action of the second negation rule;

detecting an invalid rule in response to determining that there is no intersection between the matching field of the first negation rule and the matching field of the second negation rule that are of the same matching field type;

deleting the invalid rule;

using remaining first execution rules as valid first execution rules;

performing negation on the valid first execution rules; and converting, according to a protocol supported by the first forwarding device, the valid first execution rules on which negation has been performed into a corresponding forwarding entry of the first forwarding device.

2. The method according to claim 1, wherein performing negation on the first rules comprises keeping the matching field of the first rules unchanged and performing negation on the action of the first rules, and wherein performing negation on the second rules comprises keeping the matching field of the second rule unchanged and performing negation on the action of the second rules.

3. The method according to claim 2, wherein generating the corresponding first execution rule using the first negation rules and the second negation rules according to a rule synthesis principle comprises:

using the first negation rules as an elements and performing arrangement according to a priority sequence of the first rules to constitute a first matrix, wherein the first matrix is a column matrix;

using the second negation rules as elements and performing arrangement according to a priority sequence of the second rules to constitute a second matrix, wherein the second matrix is a row matrix;

multiplying the first matrix by the second matrix to obtain a first execution rule matrix; and generating, according to the rule synthesis principle, the corresponding first execution rule using pairs of the first negation rule and the second negation rule that are multiplied and that are in the first execution rule matrix, wherein priorities of the first execution rules of the first execution rule matrix are sorted according to a column sequence of the first execution rule matrix, and wherein priorities of first execution rules in a same column are sorted according to a row sequence of the first execution rule matrix.

4. The method according to claim 3, further comprising:

adding a first matching rule as a first rule whose priority is the lowest, after decomposing the first control policy into m first rules; and adding a second matching rule as a second rule whose priority is the lowest, after decomposing the second control policy into n second rules, wherein matching fields of the first matching rule and the second matching rule are both wildcard characters, and wherein actions of the first matching rule and the second matching rule are both discarding.

5. The method according to claim 3, wherein using the remaining first execution rules as valid first execution rules comprises:

comparing matching fields of pairs of remaining first execution rules;

deleting the first execution rule whose priority is relatively low, in response to the matching fields of the pairs of first execution rules being the same; and using a remaining one of the first execution rules as the valid first execution rule after deleting the first execution rule.

6. The method according to claim 3, wherein using the remaining first execution rules as valid first execution rules comprises:

comparing matching fields of pairs of remaining first execution rules;

deleting the first execution rule of a pair of the pairs of remaining first execution rules whose matching field is relatively small; and using a remaining one of the first execution rules as the valid first execution rule after deleting the first execution rule.

7. The method according to claim 3, wherein the method further comprises:

receiving a third control policy;

decomposing the third control policy into k third rules, wherein k is a natural number, and wherein the third control policy and the first and second control policies all act on the first forwarding device;

performing negation on the valid first execution rules to obtain first negation execution rules, performing negation on the third rules to obtain third negation rules;

using the first negation execution rules as an elements and performing arrangement according to a priority sequence of the first execution rules to constitute a third matrix, wherein the third matrix is a column matrix;

using the third negation rule as an element and performing arrangement according to a priority sequence of the third rules to constitute a fourth matrix, wherein the fourth matrix is a row matrix;

multiplying the third matrix by the fourth matrix to obtain a second execution rule matrix;

generating, according to the rule synthesis principle, a corresponding second execution rule using pairs of the first negation execution rule and the third negation rule that are multiplied and that are in the second execution rule matrix, wherein the rule synthesis principle comprises forming the second execution rule using an intersection between a matching field of a first negation execution rule and a matching field of a third negation rule that are of a same matching field type or a union between a matching field of a first negation execution rule and a matching field of a third negation rule that are of different matching field types, and an intersection between an action of the first negation execution rule and an action of the third negation rule;

detecting an invalid rule using a second execution rule, wherein there is no intersection between the matching field of the first negation execution rule and the matching field of the third negation rule that are of the same matching field type;

deleting the invalid rule;

performing negation on the remaining second execution rules; and converting, according to the protocol supported by the first forwarding device, each remaining second execution rule on which negation has been performed into a corresponding forwarding entry of the first forwarding device.

8. An apparatus comprising:
a processor; and
a non-transitory computer readable storage medium storing a program for execution by the processor, the program including instructions to:
receive a first control policy;
decompose the first control policy into m first rules;
receive a second control policy;
decompose the second control policy into n second rules, wherein m and n are natural numbers, wherein both the first control policy and the second control policy act on a first forwarding device, and wherein the first rules and the second rules each comprise a matching field and an action;
perform negation on the first rules to obtain first negation rules;
perform negation on the second rules to obtain second negation rules;
generate a corresponding first execution rule using the first negation rules and the second negation rules according to a rule synthesis principle, wherein the rule synthesis principle comprises forming the first execution rule using an intersection between a matching field of a first negation rule of the first negation rules and a matching field of a second negation rule of the second negation rules that are of a same matching field type or a union between the matching field of the first negation rule and the matching field of the second negation rule that are of different matching field types, and an intersection between an action of the first negation rule and an action of the second negation rule;
use a first execution rule, in which there is no intersection between the matching field of the first negation rule and the matching field of the second negation rule that are of the same matching field type, as an invalid rule;
delete the invalid rule;
use a remaining one of the first execution rules as a valid first execution rule;
perform negation on the valid first execution rules; and
convert, according to a protocol supported by the first forwarding device, the valid first execution rules on which negation has been performed into a corresponding forwarding entry of the first forwarding device.

9. The apparatus according to claim 8, wherein the instructions to perform negation on the first rule comprises instructions to keep the matching field of the first rule unchanged and perform negation on the action of the first rule, and wherein the instructions to perform negation on the second rule comprises instructions to keep the matching field of the second rule unchanged and perform negation on the action of the second rule.

10. The apparatus according to claim 9, wherein the instructions further comprise instructions to:
use the first negation rules as elements and perform arrangement according to a priority sequence of the first rules to constitute a first matrix, wherein the first matrix is a column matrix;
use the second negation rules as elements and perform arrangement according to a priority sequence of the second rules to constitute a second matrix, wherein the second matrix is a row matrix;
multiply the first matrix by the second matrix to obtain a first execution rule matrix; and
generate, according to the rule synthesis principle, the corresponding first execution rule using pairs of the first negation rule and the second negation rule that are multiplied and that are in the first execution rule matrix, wherein priorities of the first execution rules of the first execution rule matrix are sorted according to a column sequence of the first execution rule matrix, and priorities of first execution rules in a same column are sorted according to a row sequence of the first execution rule matrix.

11. The apparatus according to claim 10, wherein the instructions further comprise instructions to:
add a first matching rule as a first rule whose priority is the lowest, after decomposing the first control policy into the m first rules; and
add a second matching rule as a second rule whose priority is the lowest, after decomposing the second control policy into the n second rules, wherein matching fields of the first matching rule and the second matching rule are both wildcard characters, and actions of the first matching rule and the second matching rule are both discarding.

12. The apparatus according to claim 10, wherein the instructions further comprise instructions to:
compare matching fields of pairs of remaining first execution rules after deleing the invalid rule;
delete a first execution rule whose priority is relatively low in response to the matching fields of the pairs of first execution rules being the same; and
use a remaining first execution rule as the valid first execution rule after deleting the first execution rule.

13. The apparatus according to claim 9, wherein the instructions further comprise instructions to:
compare matching fields of pairs of remaining first execution rules after deleing the invalid rule;
delete the first execution rule whose matching field is relatively small in response to a matching field of a first execution rule of a pair of first execution rules covering a matching field of a second execution rule of a pair of first execution rules; and
use a remaining first execution rule as the valid first execution rule after deleting the first execution rule.

14. The apparatus according to claim 9, wherein the instructions further comprise instructions to:
receive a third control policy;
decompose the third control policy into k third rules, wherein k is a natural number, and wherein the third control policy and the first and second control policies all act on the first forwarding device;
receive the k third rules;
perform negation on the valid first execution rules to obtain first negation execution rules;
perform negation on the third rules to obtain third negation rules;
use first negation execution rule as elements and perform arrangement according to a priority sequence of the first execution rules to constitute a third matrix, wherein the third matrix is a column matrix;
use the third negation rules as elements and perform arrangement according to a priority sequence of the third rules to constitute a fourth matrix, wherein the fourth matrix is a row matrix;
multiply the third matrix by the fourth matrix to obtain a second execution rule matrix;
generate, according to the rule synthesis principle, a corresponding second execution rule using pairs of the first negation execution rules and the third negation rules that are multiplied and that are in the second execution rule matrix, wherein the rule synthesis principle further comprises forming the second execution rule using an intersection between a matching field of a first negation execution rule and a matching field of a third negation rule that are of a same matching field type or a union between a matching field of a first negation execution rule and a matching field of a third negation rule that are of different matching field types, and an intersection between an action of the first negation execution rule and an action of the third negation rule;
using a second execution rule, in which there is no intersection between the matching field of the first negation execution rule and the matching field of the third negation rule that are of the same matching field type, as an invalid rule;
delete the invalid rule;
perform negation on the remaining second execution rules; and
convert, according to the protocol supported by the first forwarding device, the remaining second execution rules on which negation has been performed into a corresponding forwarding entry of the first forwarding device.

15. A non-transitory computer readable medium storing a program for execution by a processor, the program including instructions to:
receive a first control policy;
decompose the first control policy into m first rules;
receive a second control policy;
decompose the second control policy into n second rules, wherein m and n are natural numbers, wherein both the first control policy and the second control policy act on a first forwarding device, and wherein the first rules and the second rules each comprise a matching field and an action;
perform negation on the first rules to obtain first negation rules;
perform negation on the second rules to obtain second negation rules;
generate a corresponding first execution rule using the first negation rules and the second negation rules according to a rule synthesis principle, wherein the rule synthesis principle comprises forming the first execution rule using an intersection between a matching field of a first negation rule of the first negation rules and a matching field of a second negation rule of the second negation rules that are of a same matching field type or a union between the matching field of the first negation rule and the matching field of the second negation rule that are of different matching field types, and an intersection between an action of the first negation rule and an action of the second negation rule;
use a first execution rule, in which there is no intersection between the matching field of the first negation rule and the matching field of the second negation rule that are of the same matching field type, as an invalid rule;
delete the invalid rule;
use a remaining one of the first execution rules as a valid first execution rule;
perform negation on the valid first execution rules; and
convert, according to a protocol supported by the first forwarding device, the valid first execution rules on which negation has been performed into a corresponding forwarding entry of the first forwarding device.

16. The non-transitory computer readable medium according to claim 15, wherein the instructions to perform negation on the first rule comprises instructions to keep the matching field of the first rule unchanged and perform negation on the action of the first rule, and wherein the instructions to perform negation on the second rule comprises instructions to keep the matching field of the second rule unchanged and perform negation on the action of the second rule.

17. The non-transitory computer readable medium according to claim 16, wherein the instructions further comprise instructions to:
use the first negation rules as elements and perform arrangement according to a priority sequence of the first rules to constitute a first matrix, wherein the first matrix is a column matrix;
use the second negation rules as elements and perform arrangement according to a priority sequence of the second rules to constitute a second matrix, wherein the second matrix is a row matrix;
multiply the first matrix by the second matrix to obtain a first execution rule matrix; and
generate, according to the rule synthesis principle, the corresponding first execution rule using pairs of the first negation rule and the second negation rule that are multiplied and that are in the first execution rule matrix, wherein priorities of the first execution rules of the first execution rule matrix are sorted according to a column sequence of the first execution rule matrix, and priorities of first execution rules in a same column are sorted according to a row sequence of the first execution rule matrix.

* * * * *